Oct. 11, 1960 R. F. HERR Re. 24,883

MECHANICAL MOVEMENT PARTICULARLY FOR FEED APPARATUS

Original Filed Aug. 18, 1953 3 Sheets-Sheet 1

INVENTOR.
RICHARD F. HERR
BY
Michael Williams
ATTORNEY

MECHANICAL MOVEMENT PARTICULARLY FOR FEED APPARATUS
Original Filed Aug. 18, 1953 3 Sheets-Sheet 2
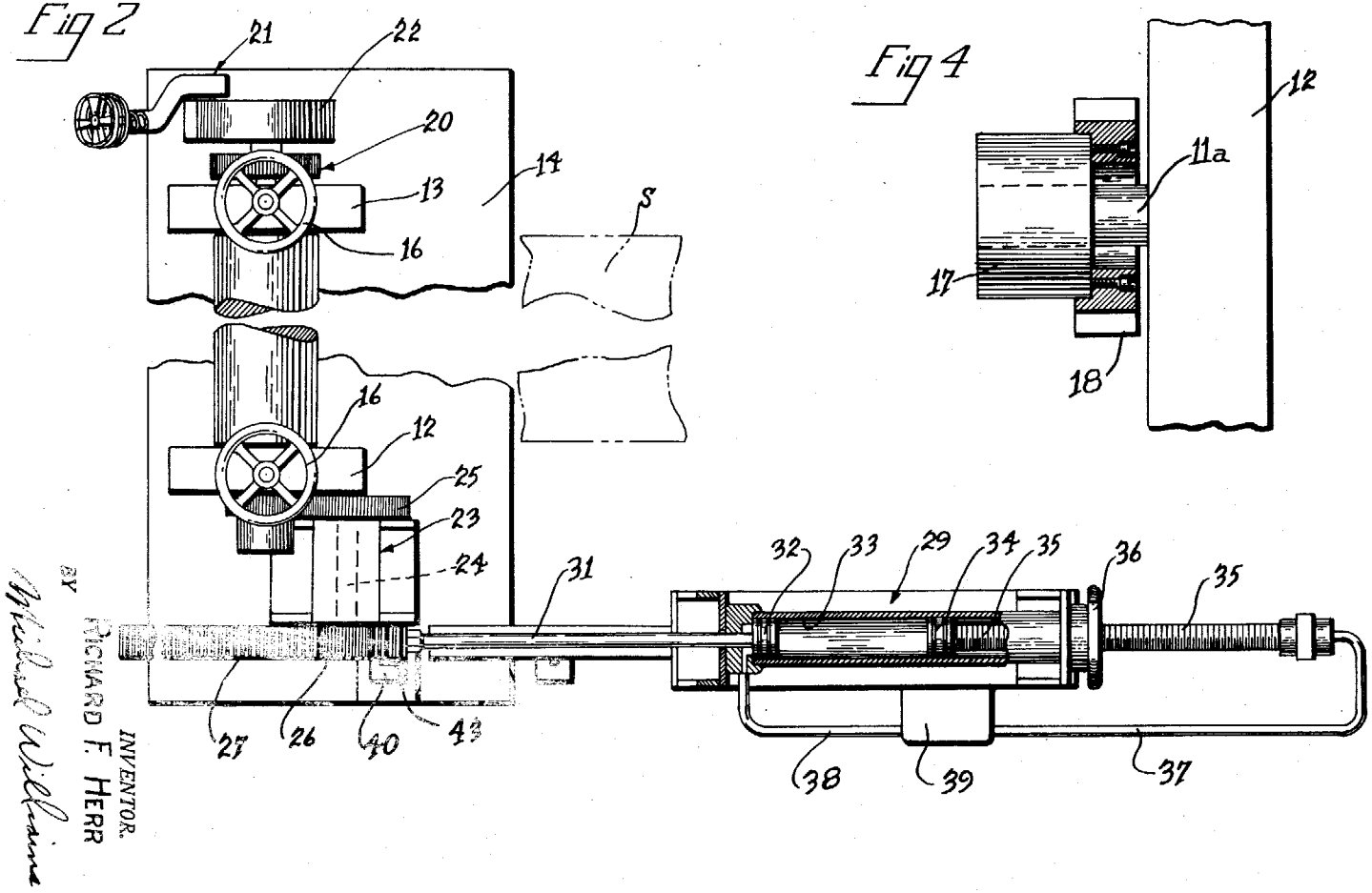
INVENTOR.
RICHARD F. HERR
BY
Michael Williams
ATTORNEY

MECHANICAL MOVEMENT PARTICULARLY FOR FEED APPARATUS

Original Filed Aug. 18, 1953 3 Sheets-Sheet 3

INVENTOR.
RICHARD F. HERR
BY
Michael Williams
ATTORNEY

United States Patent Office

Re. 24,883
Reissued Oct. 11, 1960

24,883

MECHANICAL MOVEMENT PARTICULARLY FOR FEED APPARATUS

Richard F. Herr, Cortland, Ohio, assignor, by mesne assignments, to The Herr Equipment Corporation, Warren, Ohio, a corporation of Ohio Original No. 2,819,070, dated Jan. 7, 1958, Ser. No. 374,903, Aug. 18, 1953. Application for reissue Oct. 14, 1959, Ser. No. 846,520

13 Claims. (Cl. 226—141)

Figure 1:
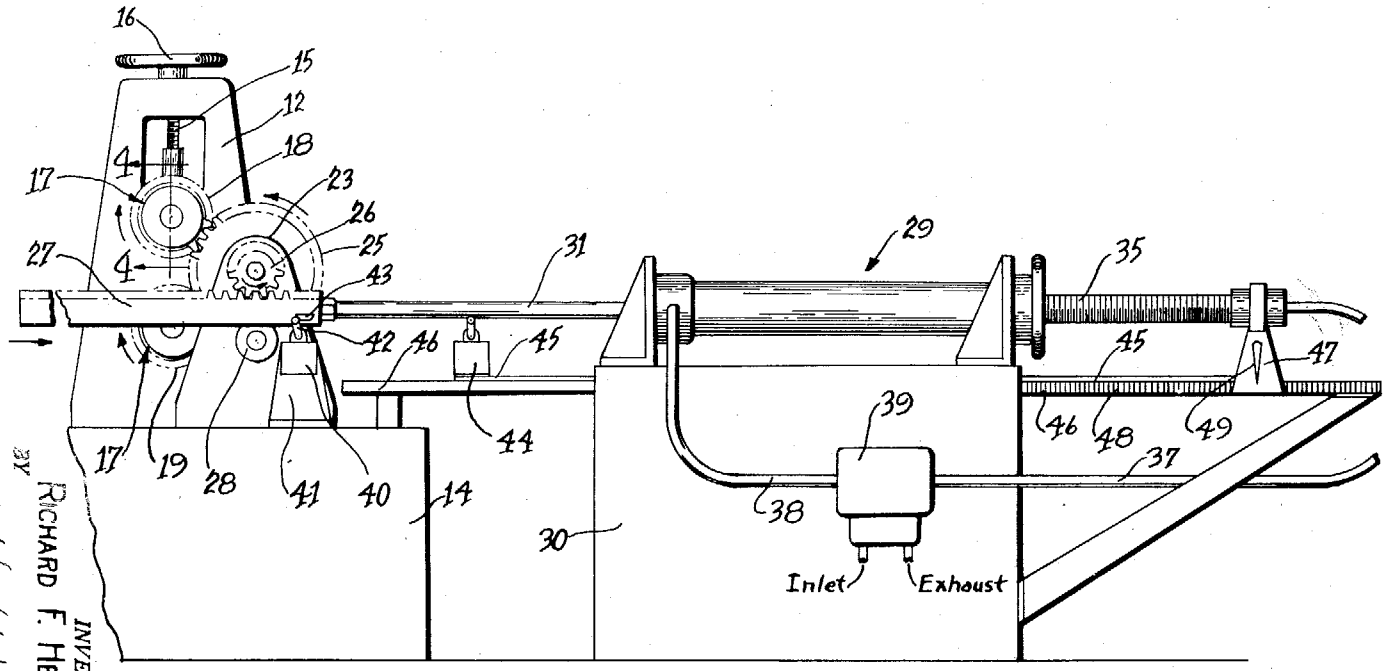

Matter enclosed in heavy brackets [ ] appears in the original patent but forms no part of this reissue specification; matter printed in italics indicates the additions made by reissue.

My invention relates to apparatus for translating reciprocating movement to unidirectional rotational movement, more particularly to feeding apparatus employing a reciprocating member to effect unidirectional rotation of one or more feed rolls, and the principal object of my invention is to provide new and improved apparatus of the character described.

With the increasing use of high-speed, automatic equipment, there has long been a need for dependable apparatus which will intermittently and accurately feed predetermined lengths of material to equipment such as high-speed presses and the like. Apparatus of the character described has been developed for feeding relatively light material at relatively slow speeds; however, such prior art apparatus has not been satisfactory for use with heavy material, high speeds, and long feeds.

In contrast, my invention is suitable for use in applications wherein prior art apparatus is unsatisfactory. Furthermore, my invention possesses other advantages which will become apparent from a study of the following description and of the drawings appended thereto.

Figure 5:
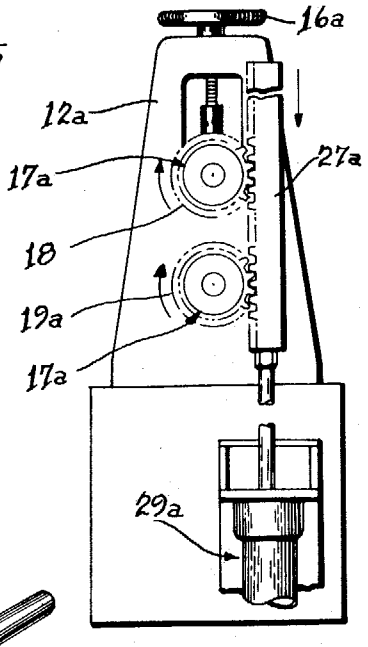
Figure 6:
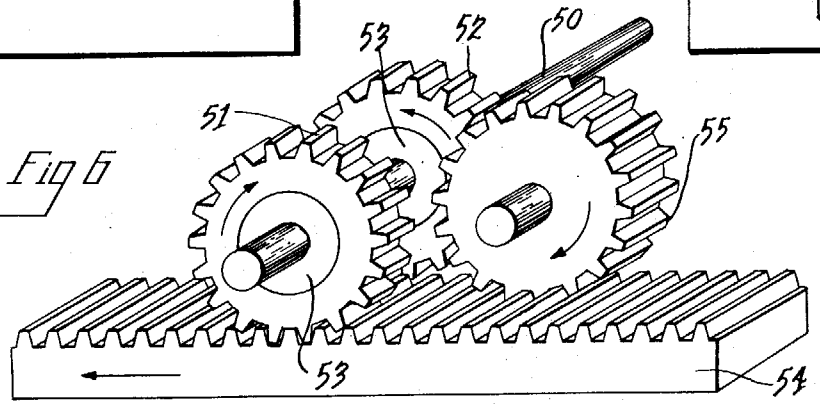
Figure 3:
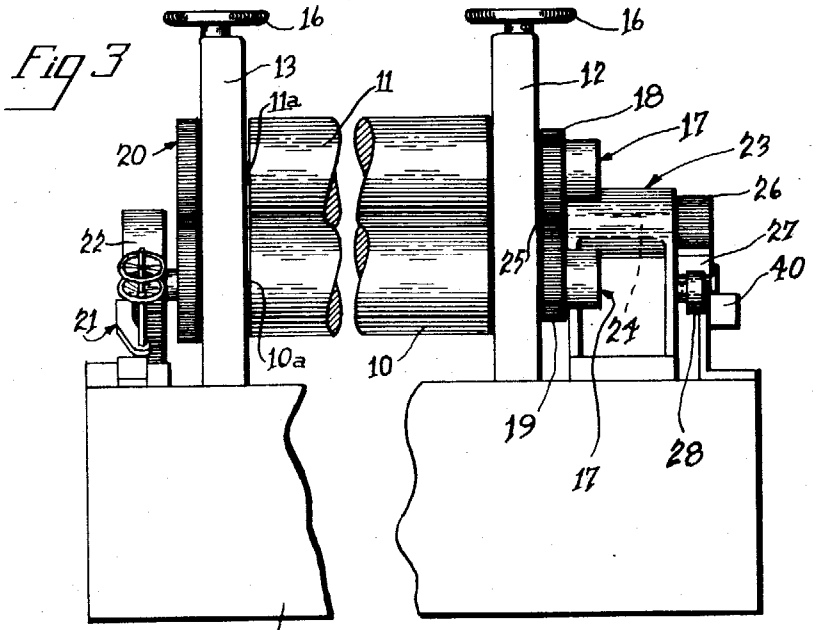

In the drawings accompanying this specification and forming a part of this application there is shown, for purpose of illustration, several embodiments which my invention may assume, and in these drawings:

Figure 1 is a side elevational view of a preferred embodiment of my invention,

Figure 2 is a top plan view of the apparatus shown in Figure 1, certain parts being shown partly in section to illustrate interior construction Figure 3 is an end elevational view of the apparatus shown in Figures 1 and 2, Figure 4 is an enlarged, fragmentary sectional view generally corresponding to the line 4—4 of Figure 1, Figure 5 is a fragmentary, side elevational view of another embodiment of my invention, and Figure 6 is a diagrammatic perspective view of a further embodiment.

As shown in Figures 1, 2 and 3, the embodiment of my invention therein illustrated comprises a pair of pinch rolls 10 and 11 each rotatably supported by spaced-apart housings 12 and 13 which are suitably secured to a base 14. As will be clear, the rolls 10, 11 provide a pass for the material to be fed, such material, in the present embodiment, being in the form of an elongated strip S (see Figure 2). It is presently preferred to support the lower roll 10 in the housings 12, 13 for rotational movement only while the upper roll 11 is adapted to be shifted toward and away from the lower roll to provide for adjustment of the spacing between the rolls so that various thicknesses of material may be accommodated. To this end, any suitable construction may be employed; for example, the roll 11 may be rotatably supported adjacent its ends by chocks which are slideably secured to the housings 12, 13. As will be understood, each chock may be shifted toward and away from the roll 10 by means of an adjusting screw 15 and a handwheel 16.

Each pinch roll 10, 11 has a respective shaft 10a, 11a which extends beyond the housing 12 as shown. As best seen in Figures 3 and 4, a one-way clutch mechanism 17 of any conventional construction is secured to each of the shaft portions which extend beyond the housing 12. In the presently disclosed embodiment, a gear 18 is secured to that clutch mechanism 17 which is secured to the shaft 11a, and a gear 19 is secured to that clutch mechanism 17 which is secured to the shaft 10a. It is believed that a detailed description of the clutches 17 is unnecessary since such clutches are a well-known, commercially available item. It will be pointed out, however, that relative rotation between the outer housing of each clutch 17 and a respective shaft may freely take place in one direction. On the other hand, relative rotation between the aforementioned parts in the opposite direction will be resisted and the two parts will be locked together for unitary rotation.

In the present embodiment, it is preferable to interconnect the rolls 10, 11 together for unitary rotation. Accordingly, each shaft 10a, 11a is extended beyond the housing 13 and one gear of a pair of intermeshed gears 20 is secured to each of the shafts, as shown, by any suitable means.

For a purpose later to be disclosed, a brake 21 is provided for the rolls 10, 11 and comprises a drum 22 secured to the shaft 10a and any suitable braking mechanism which may be adjusted to exert a predetermined drag upon the drum 22.

In the embodiment illustrated in Figures 1, 2 and 3, a housing 23 is supported by the base 14 adjacent the housing 12. The housing 23 rotatably supports a shaft 24 which extends beyond each side of the housing 23. Secured to one end of the shaft 24 is a gear 25 which meshes with each of the gears 18, 19 (see Figure 1 particularly) and secured to the other end of the shaft 24 is a gear, or pinion 26.

Means are provided for effecting rotation of the rolls 10, 11 through the aforementioned gears and such means presently comprises a reciprocable rack 27 whose teeth are in mesh with the pinion 26. As best shown in Figure 3, the under surface of the rack 27 is provided with a longitudinally extending channel, and a roller 28, rotatably mounted upon the housing 23, is seated in the channel to guide the rack and hold it in mesh with the pinion 26.

In the present embodiment, a fluid-operated cylinder 29 is employed to effect reciprocation of the rack 27. The cylinder 29 is supported adjacent the base 14 by means of a base 30 and the cylinder has a piston rod 31 extending from one end thereof and secured to the rack 27 as shown.

As illustrated in Figure 2, the cylinder 29 is of the adjustable stroke type and comprises a piston 32 reciprocable within the bore 33 of the cylinder. Another piston-like member 34 is also disposed within the bore 33, member 34 having a hollow, externally threaded rod 35 secured thereto. The rod 35 extends from the end of the cylinder 29 opposite to that from which the piston rod 31 extends and the rod 35 is threadably engageable with an adjusting wheel 36 which is rotatably secured to the cylinder 29 by any suitable means.

The hollow interior of the rod 35 communicates with the portion of the bore 33 between the piston 32 and the member 34, and the free end of the rod 35 is connected to a flexible conduit 37 which is adapted to pass fluid to and from the cylinder. Another conduit 38 is adapted to pass fluid to and from the cylinder 29 at the left-hand side of the piston 32 (in the position of parts shown in Figure 2), and conduit 38 together with conduit 37 is connected to a suitable, commercially available solenoid operated control valve 39.

As will be understood, rotation of the adjusting wheel 36 will effect movement of the member 34 within the bore 33 toward and away from the piston 32 and thus adjustment of the length of the stroke of the piston 32 will be effected.

As best shown in Figure 1, means comprising limit switches are provided to control operation of the valve 39 so that fluid flow to the cylinder 29 may be controlled to effect reciprocation of the rack 27. Accordingly, a limit switch 40 is affixed to the base 14 by means of a bracket 41, the actuator 42 of the switch 40 being engageable with a projection 43 carried by the rack 27 when the piston 32 reaches the left-hand end of its stroke.

Another limit switch 44 is positioned adjacent the rack 27 in position whereby its actuator will be tripped by the projection 43 when the rack moves to the right. Switch 44 is mounted upon one end of a slide 45 which is slidable on a suitable track 46. The opposite end of the slide 45 is secured to the afore-mentioned free end of the rod 35 by means of any suitable connecting member 47. A portion of the track 46 carries markings 48 which are cooperable with a pointer 49 carried by the member 47 to indicate the stroke setting of the cylinder 29.

It will be clear that as the rod 35 is shifted in the manner previously described to adjust the stroke of the cylinder 29, the limit switch 44 will be automatically positioned to engage with the projection 43 when the piston 32 reaches the right-hand end of its stroke.

Operation of the embodiment of my invention shown in Figures 1, 2, 3 and 4 is as follows: After the strip S has been positioned between the rolls 10, 11 and the stroke of the cylinder 29 adjusted so that the desired length of strip will be fed, any suitable means may be employed to effect operation of my feeding device. For example, the press or other apparatus (not shown) which receives the strip fed by my invention may actuate a switch (not shown) which will permit fluid to flow from the valve 39 through the conduit 38 to the left-hand side of the piston 32. Piston 32 will then move to the right, shifting the rack 27 accordingly. The rack and the gears driven thereby will move in the directions indicated by the arrows in Figure 1, and in this direction of rotation the gear 18 will rotate the rolls 10, 11 through its one-way clutch 17. At this time, gear 19 will rotate freely about shaft 10a because of the action of its clutch 17.

When the piston 32 has moved to the right-hand end of the stroke for which the cylinder 29 is adjusted, a predetermined length of material will have been fed through the rolls 10, 11. The press or other apparatus fed by my invention may now be operated, such operation being initiated, if desired, by contacts carried by the switch 44. After the press has completed its operation, it may trip a switch (not shown) to initiate another feeding cycle; however, since the switch 44 has been tripped, fluid will now be fed by the valve 39 through the conduit 37 to the right-hand side of the piston 32 so as to return the piston to the position shown in the drawings.

Movement of piston 32 from right to left will effect movement of the rack 27 and the gears shown in Figure 1 in the opposite direction from that shown by the arrows. However, rolls 10, 11 will be driven in the same direction as before since, in this direction of rotation, gear 19 will drive the rolls through its one-way clutch 17 and gear 18 will rotate freely about shaft 11a because of the action of its clutch 17.

When the piston 32 has returned to its left-hand position shown, it will trip the switch 40. This switch may also carry contacts which will initiate another operation of the press. After the press has completed its operation, the press may once again initiate another feeding cycle of my feeding apparatus in the manner previously disclosed.

As will be clear, the previously mentioned brake mechanism 21 exerts a constant drag upon the rolls 10, 11 to prevent them from over-running as a result of inertia built up at each end of the feeding stroke. In this way, a precisely controlled length of material will be fed.

Referring to Figure 5 wherein another embodiment of my invention is illustrated, it will be seen that a rack 27a is mounted for vertical reciprocatory movement and the rack meshes directly with gears 18a, 19a similar to the gears 18, 19 which are illustrated in Figures 1, 2, 3 and 4. One-way clutches 17a may support each of the gears 18a, 19a in the manner shown in Figure 4.

The rack 27a is adapted to be reciprocated by a cylinder 29a which is similar to cylinder 29 but which, in the present embodiment, is mounted vertically and which extends into a pit formed in the floor or other surface upon which the feeding apparatus is supported. As will readily be apparent, the embodiment illustrated in Figure 5 may include rolls, switches and such other necessary parts as are shown in Figures 1 through 4.

In this embodiment, the gears 18a, 19a are driven directly by the rack 27a, gear 18a driving the rolls so as to feed the material S in the direction of the arrow through its clutch when the rack is shifted in the direction shown. Obviously, in this direction of movemnt of the rack 27a, gear 19a will free-wheel because of the action of its clutch.

Movement of the rack 27a in the opposite direction will drive the rolls in the same direction as before, and in this direction of movement, gear 19a will drive the rolls through its clutch and gear 18a will free-wheel because of the action of its clutch.

A further embodiment of my invention is diagrammatically shown in Figure 6 and comprises a rotatably supported shaft 50 to which are secured, in spaced-apart relation, gears 51 and 52. A one-way clutch 53 is interposed, between each of the gears 51, 52 and the shaft 50. A reciprocably supported rack 54 engages with gear 51 and the rack also engages with a suitably supported gear 55 which is off-set in an axial direction from gear 51 so that the gears 55, 51 are not in mesh. As illustrated, gear 55 is elongated so that it meshes with gear 52 carried by the shaft 50.

In this embodiment, when the rack 54 is moved in the direction of the arrow, each of the gears will be rotated in the direction indicated. The clutches 53 will be so arranged that in this direction of movement the gear 51 will drive the shaft 50 in the direction indicated while the gear 52 will rotate freely about the shaft. Movement of the rack 54 in the opposite direction will effect rotation of all the gears in the opposite direction from that shown. However, because of the action of the clutches 53 in this direction of movement, the gear 52 will now drive the shaft 50 in the same direction as before while the gear 51 will rotate freely about the shaft.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for feeding a predetermined length of material, comprising a pair of rolls providing a pass through which the material to be fed extends and between which such material is gripped, a gear for each of said rolls, a reciprocable rack having driving engagement with each of said gears for effecting simultaneous rotation of said gears in a clockwise direction upon movement of said rack in one direction and for effecting simultaneous rotation of said gears in a counter-clockwise direction upon movement of said rack in the opposite direction, and clutch means for effecting driving engagement between one of said gears and its respective roll in one direction of movement of said rack and for effecting driving engagement between the other of said gears and its respective roll in the opposite direction of movement of said rack.

2. Apparatus for feeding a predetermined length of material, comprising a pair of rolls providing a pass through which the material to be fed extends and between which such material is gripped, a gear for each of said rolls, a reciprocable rack having driving engagement with each of said gears for effecting simultaneous rotation of said gears in a clockwise direction upon movement of said rack in one direction and for effecting simultaneous rotation of said gears in a counter-clockwise direction upon movement of said rack in the opposite direction, and clutch means effecting driving engagement between one of said gears and its respective roll and effecting driving disengagement between said other gear and its respective roll in one direction of movement of said rack, said clutch means effecting driving disengagement between said one gear and its respective roll and effecting driving engagement between said other gear and its respective roll in the opposite direction of movement of said rack.

3. Apparatus for feeding a predetermined length of material, comprising a pair of rolls providing a pass through which the material to be fed extends and between which such material is gripped, a gear for each of said rolls, a reciprocable rack having driving engagement with said gears for effecting rotation thereof, an intermediate gear interposed between and engageable with both of said first mentioned gears to translate movement of said rack in one direction to simultaneous rotation of said first mentioned gears in a clockwise direction and to translate movement of said rack in the opposite direction to simultaneous rotation of such gears in a counter-clockwise direction, and clutch means effecting driving engagement between one of said first mentioned gears and its respective roll and effecting driving disengagement between the other of said first mentioned gears and its respective roll in one direction of movement of said rack, said clutch means effecting driving disengagement between said one gear and its respective roll and effecting driving engagement between said other gear and its respective roll in the opposite direction of movement of said rack.

4. Apparatus for feeding a predetermined length of material, comprising a pair of rolls providing a pass through which the material to be fed extends and between which such material is gripped, a gear for each of said rolls, a reciprocable rack having driving engagement with each of said gears for effecting simultaneous rotation of said gears in a clockwise direction upon movement of said rack in one direction and for effecting simultaneous rotation of said gears in a counter-clockwise direction upon movement of said rack in the opposite direction, clutch means effecting driving engagement between one of said gears and its respective roll and effecting driving disengagement between said other gear and its respective roll in one direction of movement of said rack, said clutch means effecting driving disengagement between said one gear and its respective roll and effecting driving engagement between said other gear and its respective roll in the opposite direction of movement of said rack, a fluid cylinder having a piston reciprocable therein connected to said rack for reciprocating the latter through a predetermined distance, and valve means for controlling flow of fluid to said cylinder and responsive to the position of said piston to place one side of said piston in communication with a source of fluid pressure when said piston is adjacent one end of said cylinder and to place the other side of said piston in communication with such source of fluid pressure when said piston is adjacent the other end of said cylinder.

*5. Material feeding apparatus comprising a pair of juxtaposed feed rolls engageable with and forming a pass for the material to be fed and each unidirectionally rotatable a predetermined amount to feed a predetermined length of material in a single direction therebetween, a reciprocable rack having driving engagement with said rolls for effecting said unidirectional rotation thereof during reciprocation of said rack in either direction, a fluid cylinder for reciprocating said rack, and means responsive to the position of said rack for controlling fluid flow to said cylinder.*

*6. Material feeding apparatus comprising a pair of juxtaposed feed rolls engageable with and forming a pass for the material to be fed and each unidirectionally rotatable a predetermined amount to feed a predetermined length of material in a single direction therebetween, a reciprocable rack having driving engagement with said rolls for effecting said unidirectional rotation thereof during reciprocation of said rack in either direction, a fluid cylinder for reciprocating said rack, and valve means responsive to the position of said rack for controlling fluid flow to said cylinder.*

*7. Material feeding apparatus comprising a pair of juxtaposed feed rolls engageable with and forming a pass for the material to be fed and each unidirectionally rotatable a predetermined amount to feed a predetermined length of material in a single direction therebetween, a reciprocable rack having driving engagement with said rolls for effecting said unidirectional rotation thereof during reciprocation of said rack in either direction, a fluid cylinder for reciprocating said rack, said cylinder being adjustable in stroke to provide for varying the amount of unidirectional rotation imparted to said feed rolls, and valve means responsive to the position of said rack for controlling fluid flow to said cylinder.*

*8. Apparatus for feeding material intermittently comprising a pair of rolls forming a pass for the material to be fed, a reciprocable rack for rotating one of said rolls a predetermined amount to feed a predetermined length of material through the pass formed by said rolls, motion translating means interposed between said rack and one of said rolls and rotating the latter in manner to feed the material in a single direction during shifting of said rack in either direction, a fluid cylinder for shifting said rack in one direction when fluid under pressure is admitted to one end thereof and for shifting said rack in the opposite direction when fluid under pressure is admitted to the opposite end thereof, and valve means responsive to the position of said rack and reversing flow of fluid to said cylinder after said rack has been shifted a predetermined amount in either direction.*

*9. Apparatus for feeding a predetermined length of material, comprising a pair of rolls forming a pass for the material to be fed, a gear for each roll, a reciprocable rack engaged with said gears for effecting simultaneous rotation of said rolls in opposite directions, clutch means interposed between each gear and its roll, one clutch means effecting driving engagement between one of said gears and its respective roll upon movement of said rack in one direction and said other clutch means effecting driving engagement between the other of said gears and said other roll upon movement of said rack in the opposite direction, a fluid cylinder connected to said rack for reciprocating the latter from one position to another, and valve means for controlling flow of fluid to said cylinder and responsive to the position of said rack for reversing flow of fluid to said cylinder following movement of said rack to respective positions.*

*10. Material feeding apparatus comprising a pair of rolls forming a pass for the material to be fed, a reciprocable rack for rotating one of said rolls a predeter-*

*mined amount to effect feeding of a predetermined length of material through the pass formed by said rolls, motion translating means interposed between said rack and one of said rolls for effecting rotation of the latter in manner to feed the material in a single direction during shifting of said rack in either direction, a fluid cylinder for shifting said rack in one direction to a predetermined position when fluid under pressure is admitted to one end thereof and for shifting said rack in the opposite direction to another predetermined position when fluid under pressure is admitted to the other end thereof, and valve means controlling fluid flow to said cylinder and having an actuator responsive to the position of said rack for effecting operation of said valve means to reverse flow of fluid to said cylinder following movement of said rack to respective positions.*

*11. Material feeding apparatus comprising a feed roll engageable with the material to be fed and unidirectionally rotatable a predetermined amount to feed a predetermined length of material in a single direction, a reciprocable rack for rotating said roll, means interposed between said rack and said roll for translating a predetermined amount of reciprocable movement in either direction of the former to a predetermined amount of unidirectional rotation of the latter, an adjustable-stroke fluid cylinder including a piston for shifting said rack in one direction, between two extreme positions whose spacing is directly related to the length of cylinder stroke, when fluid is admitted to one side of said piston and for shifting said rack in the opposite direction between said extreme positions when fluid is admitted to the other side of said piston, and valve means for controlling fluid flow to said cylinder and responsive to the length of cylinder stroke and to the position of said rack for reversing flow of fluid to said cylinder when said rack is disposed at respective extreme positions.*

*12. Material feeding apparatus comprising a feed roll engageable with the material to be fed and unidirectionally rotatable a predetermined amount to feed a predetermined length of material in a single direction, a reciprocable rack for rotating said roll, means interposed between said rack and said roll for translating a predetermined amount of reciprocable movement in either direction of the former to a predetermined amount of unidirectional rotation of the latter, an adjustable-stroke fluid cylinder including a piston for shifting said rack in one direction, between two extreme positions whose spacing is directly related to the length of cylinder stroke, when fluid is admitted to one side of said piston and for shifting said rack in the opposite direction between said extreme positions when fluid is admitted to the other side of said piston, valve means for controlling fluid flow to one side or the other of the piston of said fluid cylinder to effect reversal of movement thereof, means for adjusting the length of stroke of said fluid cylinder, and valve actuator means positioned by operation of said fluid cylinder stroke adjusting means for engagement with said rack at one of its extreme positions to control operation of said fluid valve and reverse flow of fluid to said cylinder upon disposition of said rack at said position.*

*13. Material feeding apparatus for use with material working apparatus, comprising a pair of juxtaposed feed rolls engageable with and forming a pass for the material to be fed and each unidirectionally rotatable a predetermined amount to feed a predetermined length of material therebetween in a single direction to the material working apparatus, a reciprocable rack having driving engagement with said rolls for effecting said unidirectional rotation thereof during reciprocation of said rack in either direction, a fluid cylinder for reciprocating said rack, and means responsive to the position of said rack for controlling the direction of fluid flow to said cylinder and responsive to operation of the material working apparatus for initiating fluid flow to said cylinder in accordance with such operation.*

References Cited in the file of this patent or the original patent

UNITED STATES PATENTS

| | | |
|---|---|---|
| 284,530 | Zassenhaus | Sept. 4, 1883 |
| 285,372 | Babcock | Sept. 25, 1883 |
| 963,828 | Swift | July 12, 1910 |
| 1,555,745 | Carrasco-Sanchez | Sept. 29, 1925 |
| 1,851,753 | Crane | Mar. 29, 1932 |
| 2,124,267 | Waibler | July 19, 1938 |
| 2,315,446 | Miller | Mar. 30, 1943 |
| 2,389,929 | Paulsen | Nov. 27, 1945 |
| 2,451,467 | Bickel | Oct. 19, 1948 |
| 2,660,427 | Haller | Nov. 24, 1953 |
| 2,660,471 | Egly et al. | Nov. 24, 1953 |
| 2,665,905 | Lyon | Jan. 12, 1954 |